H. W. LEAVITT.
TRACTION PLOW.
APPLICATION FILED MAR. 14, 1910.
990,993.
Patented May 2, 1911.
2 SHEETS—SHEET 1.
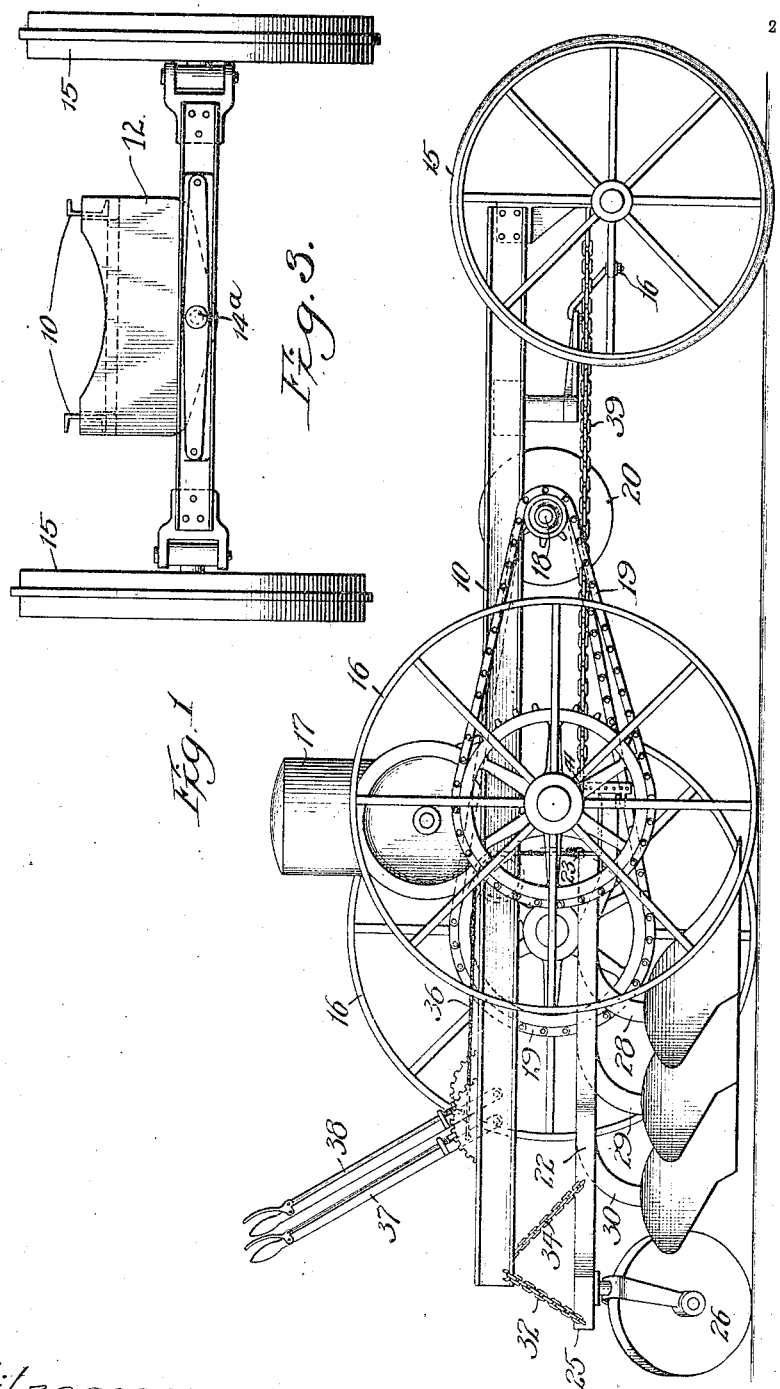
Witnesses:
Geo. E. Davious
Thos. F. Murray
Inventor:
Harry W. Leavitt
By Linthicum, Belt & Fuller
Attys

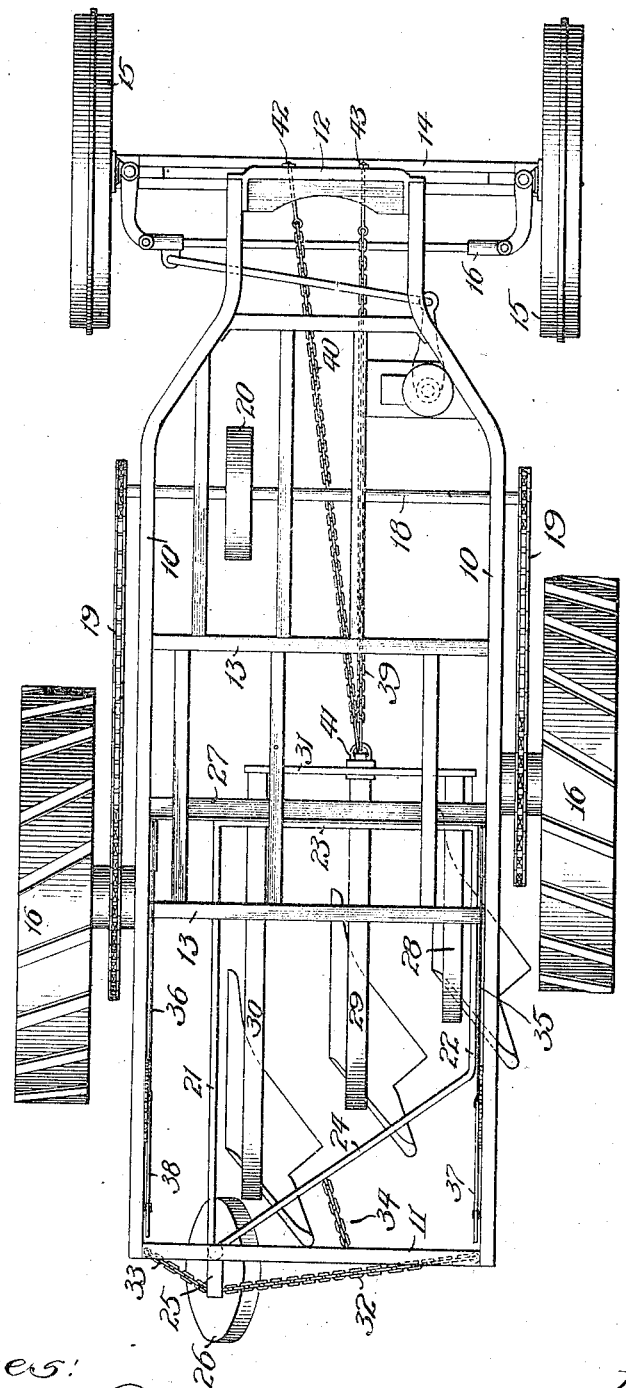

UNITED STATES PATENT OFFICE.

HARRY W. LEAVITT, OF DE KALB, ILLINOIS.

TRACTION-PLOW.

990,993.  Specification of Letters Patent.  Patented May 2, 1911.

Application filed March 14, 1910. Serial No. 549,189.

*To all whom it may concern:*

Be it known that I, HARRY W. LEAVITT, of the city of De Kalb, county of Dekalb, and State of Illinois, have invented certain new and useful Improvements in Traction-Plows, of which the following is a specification.

My invention relates to a machine comprising a main frame provided with steering and traction wheels and an engine for propelling the same and which is provided with a flexibly supported frame, in which may be mounted earth-working devices of any description, such as gang plows of the mold board or disk type, ditching tools or the like. I have shown my improved traction plow as provided with three mold board plows mounted in suitable relation to each other, and have provided suitable means for pivotally connecting the beams of said plows to a rigid frame, the latter being flexibly suspended to the main frame of the machine with means for vertically adjusting the said rigid frame at either side without disturbing the adjustment of the opposite side. The plow frame furthermore has a flexible draft connection with the front end of the main frame and at the rear end has the usual caster wheel.

A novel feature of my invention consists in a peculiar arrangement of the traction wheels with reference to each other and with reference to the draft connection between the supplemental frame and the main frame, the said traction wheels being mounted upon different parallel axes instead of being alined as in the usual construction.

The advantages of these several novel features of construction will be hereinafter described and the various novel features and combinations of devices comprising my invention will be pointed out in the claims.

In the accompanying drawings; Figure 1 is a side elevation; Fig. 2 is a plan view, the engine being omitted in the last named figure, and Fig. 3 is a front end view showing the manner of attaching the front axle to the main frame.

The principal elements of my improved traction plow which are delineated in the drawings comprise a main frame of generally rectangular form, having the side members, 10, and rear and front members, 11—12, which may be suitably cross-braced, as indicated at 13. The front end of the main frame has secured thereto, an oscillating but non-rotative axle, 14, on which is mounted the steering wheels, 15—15, having the usual controlling means, 16. A gasolene or other suitable engine, indicated at, 17, is mounted upon the main frame, preferably between the axes of the traction wheels, 16. The traction wheels are mounted upon stub shafts, one of which is placed in advance of the other, so that the axes of rotation of the said traction wheels are parallel to each other but not in alinement. Practically therefore, the main frame is balanced upon these short axles and has two non-alined points of support, thus preventing the rocking of the frame over the axes of the traction wheels and avoiding the placing of the weight of the machine and the draft of the plows upon the steering wheels. This arrangement also affords greater rigidity to the structure.

As will be seen, the front end of the main frame has a single point of support and the rear end two points of support. Therefore the frame is supported at but three points. This is particularly advantageous, as if one of the traction or steering wheels drops into a depression or rises to surmount an obstacle, the frame is not strained at any point as it will oscillate freely upon its pivotal support, 14ª. The motive power of the engine is transmitted to the traction wheels through the driving shaft, 18, and the usual sprocket chains, 19—19, 20 indicating the usual differential gear on the driving shaft.

To support the earth working devices, I employ a supplemental frame composed of the members, 21—22—23 and 24, terminating in a support, 25, for the caster wheel, 26. The front member, 23, of said frame may have rigidly secured thereto, the cross member, 27, shown in the form of an angle bar, the plow beams, 28—29—30, being connected together by the cross member, 31, and also to the cross member, 27. The rear end of the supplemental frame is flexibly connected to the main frame by means of the chains or equivalent flexible supports, 32—33—34. The forward end of the supplemental frame is flexibly and adjustably supported from the main frame by means of the cables, 35 and 36, which are connected to the hand levers, 37 and 38, pivoted on the main frame and having the usual segment racks and pawls for locking them in the adjusted position, said cables, 35 and 36, passing over pulleys shown in dotted lines in Fig. 1. The supplemental frame has a draft connection from the front end of the main frame composed of flexible elements, such as the chains, 39—40, connected to the clevis, 41, at midlength of the cross element, 31, joining the front ends of the plow beams. The draft chain, 39, is arranged in the line of draft and the draft chain, 40, diverges from the point of connection, 41, forwardly to the front end of the main frame toward the land-side, the connection of the front end of the draft chains being shown in the form of eye-bolts having adjusting nuts, 42—43. By means of this arrangement of the draft chains and by providing them with adjusting means, the side draft of the plows may be corrected, the chain, 34, at the rear of the gang plows coöperating in this result.

From the foregoing description it will be seen that the weight of the machine as well as the load imposed by the draft of the earth-working devices is received mainly upon the traction wheels and the latter being placed in staggered relation to each other, steadiness of operation is assured. Furthermore, the plows or other earth-working devices being mounted directly beneath the main frame, the draft connection thereto being located in advance of the axis of one of said traction wheels and the supplemental frame carrying the plows being flexibly supported from the main frame and provided with means for adjusting it, the plows are easily and conveniently controlled. Furthermore, the supplemental frame may be adjusted or raised and lowered at its forward end, or it may be rocked; that is, raised or lowered at either side without disturbing the adjustment of its opposite side and without changing the alinement of the plow bodies relative to each other. It will be observed that the location of the supplemental or plow frame is such that the point of the leading plow is in advance of the axis of the rear traction wheel and it results that such point may be readily carried over an obstruction such as the approach to a bridge, by the forwardly disposed traction wheel; that the supplemental frame being flexibly supported, may be adjusted as before described, by reason of the fact that the draft connection is not only flexible, but is extended from the supplemental frame forwardly to the front end of the main frame, the length of this connection and the flexible character of the supports for the supplemental frame permitting various adjustments without disturbance from the pull of the draft connections. Furthermore, it will be seen that the arrangement of the traction wheels affords greater stability to the machine when used stationarily for the purpose of driving other machines, such as feed cutters, corn shellers and the like, and that the flexible conditions described permit of an adjustment of the plows within a wide range. Obviously also, various types of earth-working implements may be used on my improved tractor by adapting a suitable frame thereto, the flexible connections of the supplemental frame to the main frame permitting ready attachment and detachment.

I have not shown the driver's seat, the steering wheel and other accessories, all of which, it will be understood will be suitably disposed upon the main frame in convenient positions.

As various modifications of my invention will readily suggest themselves to one skilled in the art, I do not limit myself to the precise construction herein shown and described.

I claim:

1. A traction plow comprising, in combination, a main frame, steering wheels and non-alined traction wheels, and a supplemental frame carrying earth-working implements mounted on said main frame at points substantially between the axial center lines of said non-alined traction wheels, substantially as described.

2. A traction plow comprising, in combination, a main frame, steering wheels and non-alined traction wheels, and a supplemental frame carrying earth-working implements having connections to said main frame at points close to the axial center lines of said non-alined traction wheels, whereby a force is transmitted from said supplemental frame to said non-alined wheels through said connections in a line substantially coincident with a vertical line through the axes of said wheels, substantially as described.

3. A traction gang plow comprising a main frame, steering and traction wheels journaled to said frame, a plow carrying frame flexibly supported beneath said main frame, one of said traction wheels being journaled to said main frame in front of a point of support of said plow frame and the other of said traction wheels being journaled in the rear of a point of support of said plow frame, substantially as described.

HARRY W. LEAVITT.

Witnesses:
JOHN A. DOWDALL,
BERT BEMIS.

---

Copies of this patent may be obtained for five cents each, by addressing the "Commissioner of Patents, Washington, D. C."